(12) United States Patent
Okawa

(10) Patent No.: US 6,567,988 B1
(45) Date of Patent: May 20, 2003

(54) VIDEO SIGNAL TRANSMISSION APPARATUS AND VIDEO SIGNAL TRANSMISSION METHOD

(75) Inventor: Hiroshi Okawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/068,203

(22) Filed: May 1, 1998

Related U.S. Application Data

(63) Continuation of application No. PCT/JP97/03069, filed on Sep. 2, 1997.

(30) Foreign Application Priority Data

Sep. 2, 1996 (JP) .............................................. 8-232159

(51) Int. Cl.$^7$ .............................................. H04N 7/173
(52) U.S. Cl. ...................... 725/127; 725/125; 725/124; 725/108; 725/109; 375/300; 375/268; 348/723; 455/43
(58) Field of Search ............................ 725/98, 118, 124, 725/125, 127; 375/300, 301, 268, 269, 270; 348/723, 724, 608; 455/33, 45, 43

(56) References Cited

U.S. PATENT DOCUMENTS

| | | | | |
|---|---|---|---|---|
| 3,814,929 A | * | 6/1974 | Whitfield ..................... | 359/238 |
| 3,843,940 A | * | 10/1974 | Ishiguro et al. ............. | 348/472 |
| 4,303,952 A | * | 12/1981 | Yamamitsu et al. .......... | 360/29 |
| 4,363,053 A | * | 12/1982 | Kanamoto et al. ............ | 360/67 |
| 4,388,638 A | * | 6/1983 | Dischert et al. ............. | 348/472 |
| 4,427,950 A | * | 1/1984 | Akagiri et al. ............... | 330/149 |
| 4,779,133 A | * | 10/1988 | Sugimori et al. ........... | 348/612 |
| 5,063,445 A | * | 11/1991 | Nishizawa et al. ..... | 375/240.25 |
| 5,136,381 A | * | 8/1992 | Citta et al. ................ | 348/437.1 |
| 5,486,929 A | * | 1/1996 | Heyl .......................... | 348/713 |
| 5,579,336 A | * | 11/1996 | Fitzgerald et al. ........ | 333/28 R |

FOREIGN PATENT DOCUMENTS

| | | |
|---|---|---|
| JP | 3-213076 | 9/1991 |
| JP | 4-66432 | 10/1992 |
| JP | 5-62864 | 9/1993 |

\* cited by examiner

*Primary Examiner*—Andrew Faile
*Assistant Examiner*—Jason Salce
(74) *Attorney, Agent, or Firm*—Frommer Lawrence & Haug LLP; William S. Frommer

(57) ABSTRACT

In transmitting the analog video signal via a coaxial cable, a transmission apparatus side is not provided with an emphasis characteristic which is the inverse to the frequency attenuation characteristic of the coaxial cable. In stead, an emphasis is applied by a preemphasis circuit on the transmission side, on the basis of an emphasis curve of a frequency band characteristic curve having an inverse characteristic to a frequency band characteristic curve of a detected signal which is obtained when transmitting a modulated signal without a preemphasis to the coaxial cable and conducting synchronous detection on a receiving apparatus side by using an oscillation frequency having the same frequency as that of a carrier used at the time of modulation.

3 Claims, 13 Drawing Sheets

30 INPUT SIGNAL

31 MODULATED SIGNAL

36 ZERO POINT INSERTED WAVEFORM

35 SAMPLING

37 PRE-EMPHASIZED OUTPUT

VIDEO SIGNAL TRANSMISSION APPARATUS AND VIDEO SIGNAL TRANSMISSION METHOD

This is a continuation of copending International Application PCT/JP97/03069 having an international filing date of Sep. 2, 1997.

TECHNICAL FIELD

The present invention relates to a video signal transmission apparatus and a video signal transmission method suitable for transmission of a video signal via a wire transmission line such as a coaxial cable.

BACKGROUND ART

In a conventional studio camera facility, a FPU (Field Pick Up) apparatus and the like, a modulated video signal is transmitted and received between a studio camera and a camera control unit and between a transmitting/receiving antenna (head unit) and a FPU control unit via a coaxial cable. In the FPU and the like, the coaxial cable installed between the head unit and the control unit is as long as 300 m at its maximum.

In the same way, the studio camera facility or the like is arranged as shown in FIG. 7. That is, a studio camera 1 is installed within a studio 2. A video signal picked up by a camera head 4 which is in turn mounted on a studio adaptor 3 and a picture video signal monitored on a view finder 5 are transmitted/received between a control panel 8 consisting of a switcher and a control console installed in a control room 7, and a camera control unit 9 via a coaxial cable 6.

Such a coaxial cable 6 is pulled about over a considerable length (about 100 m) in the studio 2. Therefore, the video signal transmitted through this coaxial cable 6 is significantly reduced as the frequency thereof becomes higher, resulting in a transmission line characteristic 32 as shown in FIG. 9B. Attenuation amounts of these coaxial cables 6 differ depending upon the characteristic impedance of the coaxial cable 6. However, it is well known that the attenuation amount of the frequency characteristic of a coaxial cable 6 having a characteristic impedance of 75 Ω increases in proportion to $\sqrt{f}$ in the television signal frequency band, if f represents its frequency.

When an analog video signal subjected to, for example, amplitude modulation is to be transmitted to the camera control unit 9 or the like via such a coaxial cable 6, its high frequency component is attenuated in the coaxial cable 6 and consequently the video signal waveform transmitted cannot be reproduced on the side of the camera control unit 9. Conventionally, therefore, the analog video signal was passed through a pre-emphasis circuit having a frequency characteristic raised beforehand in the high frequency component so as to have an inverse characteristic with respect to the transmission characteristic (FIG. 9B) of the coaxial cable 6. Thus the characteristic in the transmission line such as the coaxial cable was canceled.

Such a conventional configuration that the attenuation of the high frequency component in the coaxial cable 6 is compensated by the above described pre-emphasis circuit will now be described by referring to FIG. 8.

In FIG. 8, a picked signal by the camera 1 is digitized, and made as an input signal 30, which is a serial digital signal of 80 Mbps as shown in FIG. 11A, and then input to the camera control unit 9 via an input terminal 10. This input signal 30 is supplied to a modulator 11. In a configuration of, for example, a DDS (Direct Digital Synthesize) system, the modulator 11 conducts amplitude modulation on a carrier having a carrier frequency of 80 MHz by using the serial digital signal supplied as the input signal. As a result, there is obtained a modulated signal having a bandpass characteristic 34 having a bandwidth extending from f1 to f2 with a carrier frequency fc as a center, as shown in FIG. 9A. The modulated signal is transmitted via the coaxial cable 6.

The above described modulator 11 is a digital modulator. Since the input signal is a digital signal, its harmonic components extend to high frequencies. In order to extract the band of the baseband (FIG. 9A), therefore, an LPF 11a is inserted in the modulator 11, which is, for example, a transversal filter of an FIR (finite impulse response) type as shown in FIG. 13. This LPF 11a extracts, for example, the baseband fc and a third harmonic 3fc located in regions indicated by dots in FIG. 10A.

Subsequently in a multiplier 11b in the modulator 11, when the carrier of 80 MHz is multiplied by the digital signal of 80 Mbps and modulated, as shown in FIG. 10B, the spectrum of a second harmonic 2fc is moved in frequency to the center carrier frequency fc of the baseband. From the modulator 11, a modulated signal 31 of 80 Mbps×2=160 Mbps as shown in FIG. 11B is thus output.

In order to effect pre-emphasis with an inverse characteristic to the transmission characteristic curve 32 of the coaxial cable 6 shown in FIG. 9B and thereby make the frequency characteristic on the receiving side (the side of the camera control unit 9) flat up to a high frequency component, a pre-emphasis characteristic 33 must be such that the characteristic in the transmitting end has a lower level (attenuation amount) on the side of the low frequency component f1 with respect to the center carrier frequency fc and a higher level on the side of the high frequency component f2 as shown in FIG. 9C.

Assuming that such a pre-emphasis characteristic 33 is provided, the spectra of FIG. 10B become as shown in FIG. 10C. For producing the spectrum having such a transmitting end characteristic which is asymmetric with respect to the center carrier frequency fc of the baseband, it is necessary to supply the modulated signal (FIG. 11B) of 160 Mbps output from the modulator 11 to a zero point insertion circuit 12 as shown in FIG. 8, conduct sampling at sampling points 35 located on zero points as shown in FIG. 11C, and conduct digital signal processing at at least 4fc. In this way, the modulated signal 31 of 160 Mbps is supplied to a pre-emphasis circuit 13 as a zero point inserted waveform 36 of 320 Mbps as shown in FIG. 11C. This pre-emphasis circuit 13 is also formed by a FIR transversal filter as shown in FIG. 13.

A preemphasis output 37 of 320 Mbps obtained by the preemphasis conducted in the preemphasis circuit 13 becomes as represented by a discrete time waveform in FIG. 11D.

The pre-emphasized output signal is subjected to digital-analog conversion in a digital-analog converter (DAC) 14, then passed through a bandpass filter (BPF) 15, amplified by an amplifier 16, and then supplied to the wire transmission line such as the coaxial cable 6 or the like as the transmitting output. As a result, the pre-emphasized output signal is extracted as shown in FIG. 10D. The modulated video signal pre-emphasized in the baseband is canceled in its high frequencies at the receiving end. It thus becomes possible to supply a video signal having a flat frequency characteristic over the range of f1 to f2.

The longer the coaxial cable 6 becomes, the higher the high frequency component of the video signal must be raised before transmission in the above described conventional configuration. Therefore, a high frequency component 38 as shown in FIG. 12A is differentiated and whisker-like components such as an overshoot 39 or undershoots 40 increase as shown in FIG. 12B. Because of such disorder of the waveform, it becomes necessary to make the dynamic range of the amplifier and the like on the transmitting side large.

This makes the design of the transmission output amplifier difficult. In addition, this increases the number of word length bits in the modulator 11 of the DDS system. In high speed transmission involving only a DAC having a limited number, the quantity of preemphasis cannot be made very large. This resulted in a problem that the length of the coaxial cable which can be compensated by the preemphasis cannot be extended.

In addition, the frequency band characteristic must have an attenuation characteristic which is asymmetric with respect to the center carrier frequency fc as shown in FIG. 9C. As described before with reference to FIG. 10C, therefore, the digital signal processing frequency of 4fc is required. This resulted in a problem that the power dissipation increased accordingly and the circuit scale had to be made large.

DISCLOSURE OF INVENTION

The present invention is to provide a video signal transmission apparatus and a video signal transmission method which solve the above described problems. An object of the present invention is to obtain a video signal transmission apparatus and a video signal transmission method which minimizes the increase of the dynamic range of a transmitting side output, which reduces the processing frequency required when forming the preemphasis circuit by using a FIR transversal filter to half as compared with the prior art, and which thus saves the power dissipation.

A video signal transmission apparatus according to the present invention includes an amplitude modulation means 11 for amplitude-modulating a carrier by using digital video data, a preemphasis means 13 for applying preemphasis to a modulated signal 31 modulated by the modulation means 11, a digital-to-analog conversion means 14 for converting output data pre-emphasized by the preemphasis means 13 to an analog video signal, and a wire transmission line 6 for transmitting the analog video signal supplied from the digital-to-analog conversion means 14 to a receiving end, as shown in its one example in FIG. 1, and the preemphasis means 13 conducts the preemphasis with a frequency characteristic which is the inverse of a frequency characteristic obtained when the analog video signal transmitted via the wire transmission line 6 without being pre-emphasized is detected at the receiving end.

According to the present invention, the zero point insertion circuit becomes unnecessary. The processing frequency required when forming the preemphasis circuit by using a digital filter can be reduced to half as compared to the prior art. Thus the power can be saved.

BEST MODE FOR CARRYING OUT THE INVENTION

Figure 1:
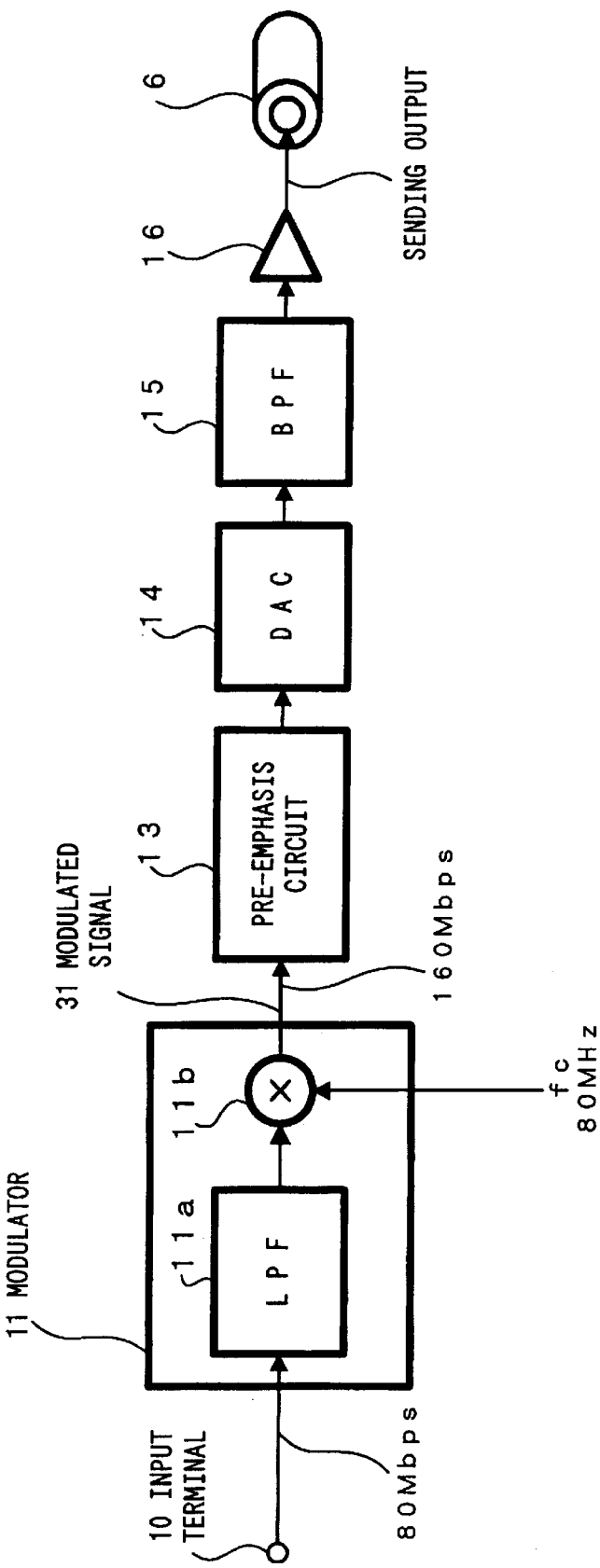
FIG. 1 is a system diagram showing the sending side of an example of a video signal transmission apparatus according to the present invention.
Figure 7:
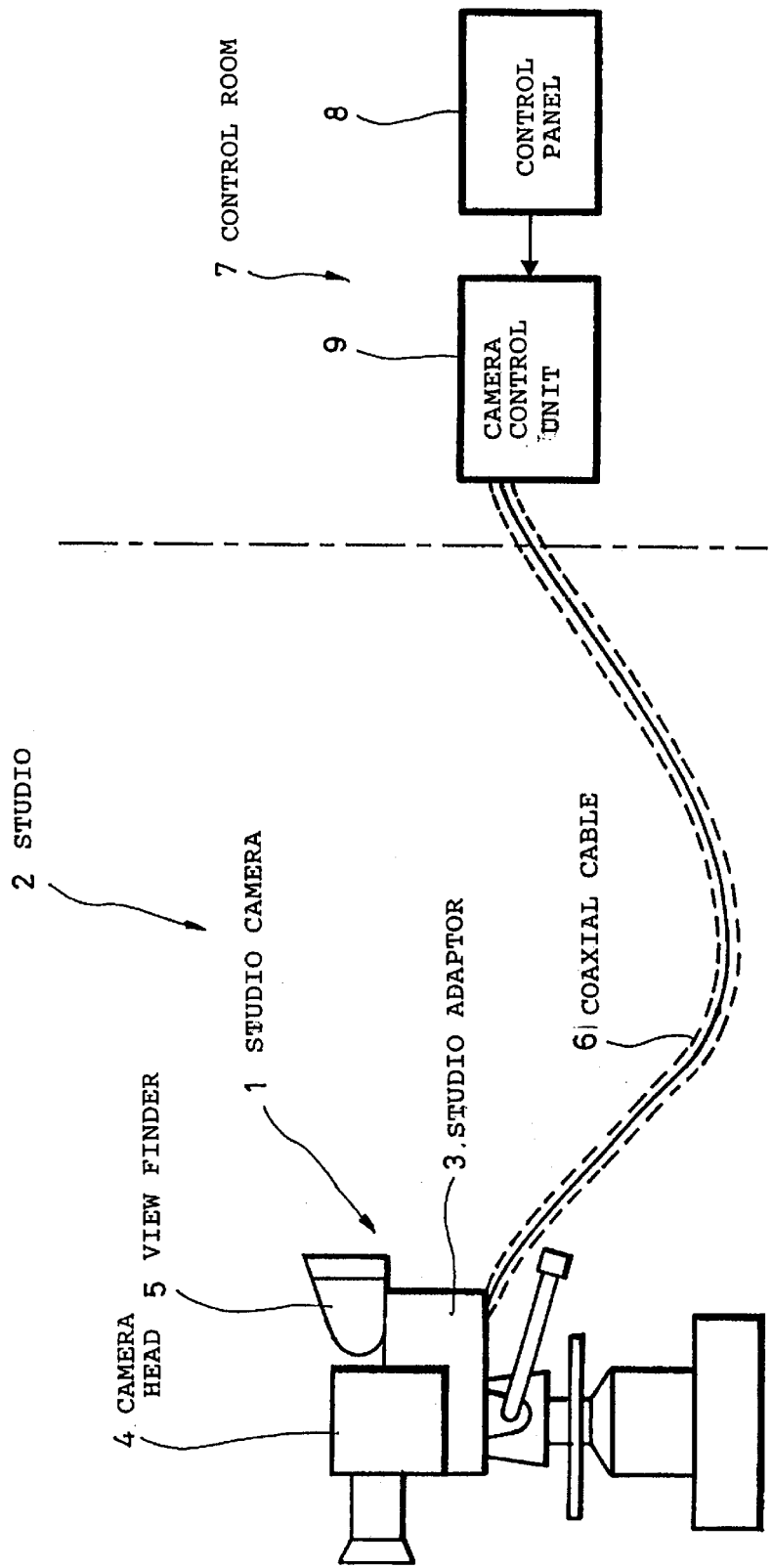
FIG. 7 is a configuration diagram showing an example of a conventional studio camera apparatus.
Figure 8:
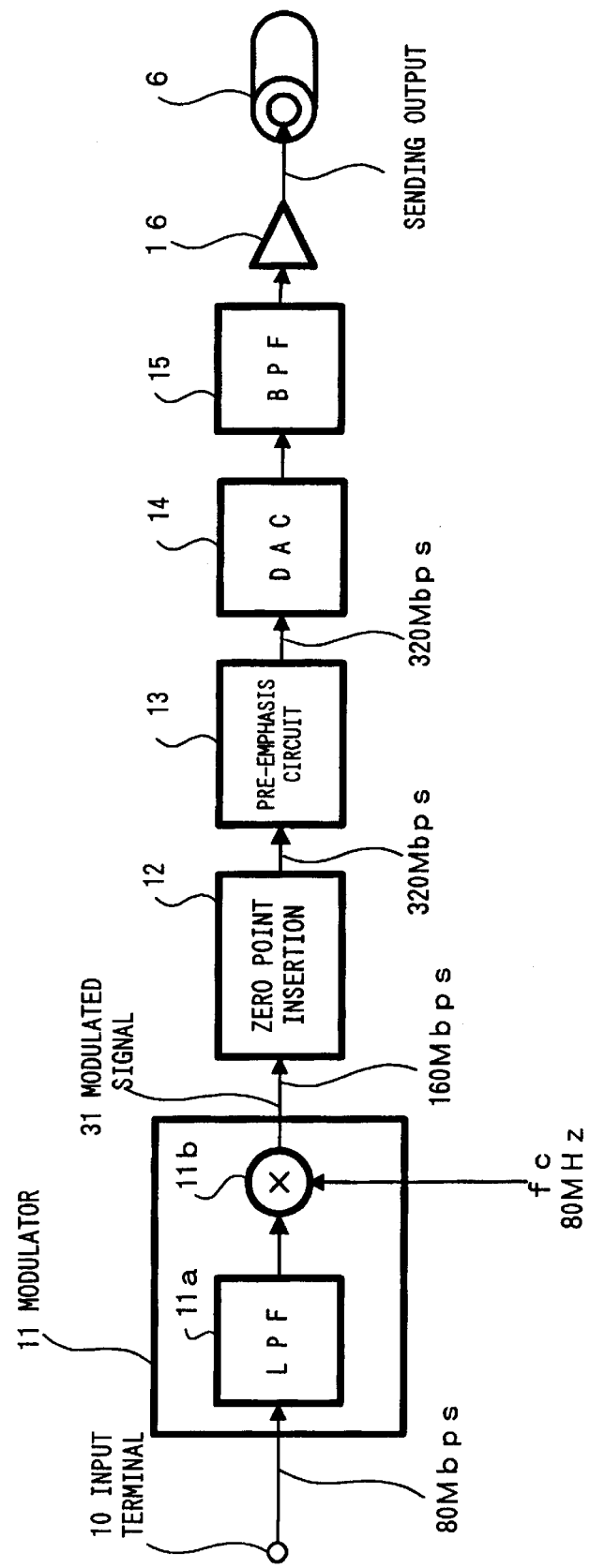
FIG. 8 is a system diagram showing a transmission side of an example of a conventional video signal transmission apparatus.

Hereafter, an example of the video signal transmission apparatus and the video signal transmission method according to the present invention will be described in detail by referring to FIG. 1 through FIG. 6. In the case of the present example as well as described in FIG. 7, the case where the picked up signal supplied from the camera 1 and the video signal supplied from the camera control unit 9 are transmitted via the coaxial cable 6 will now be described. In FIG. 1, components corresponding to those of FIG. 8 are denoted by the same reference numerals.

Figure 13:
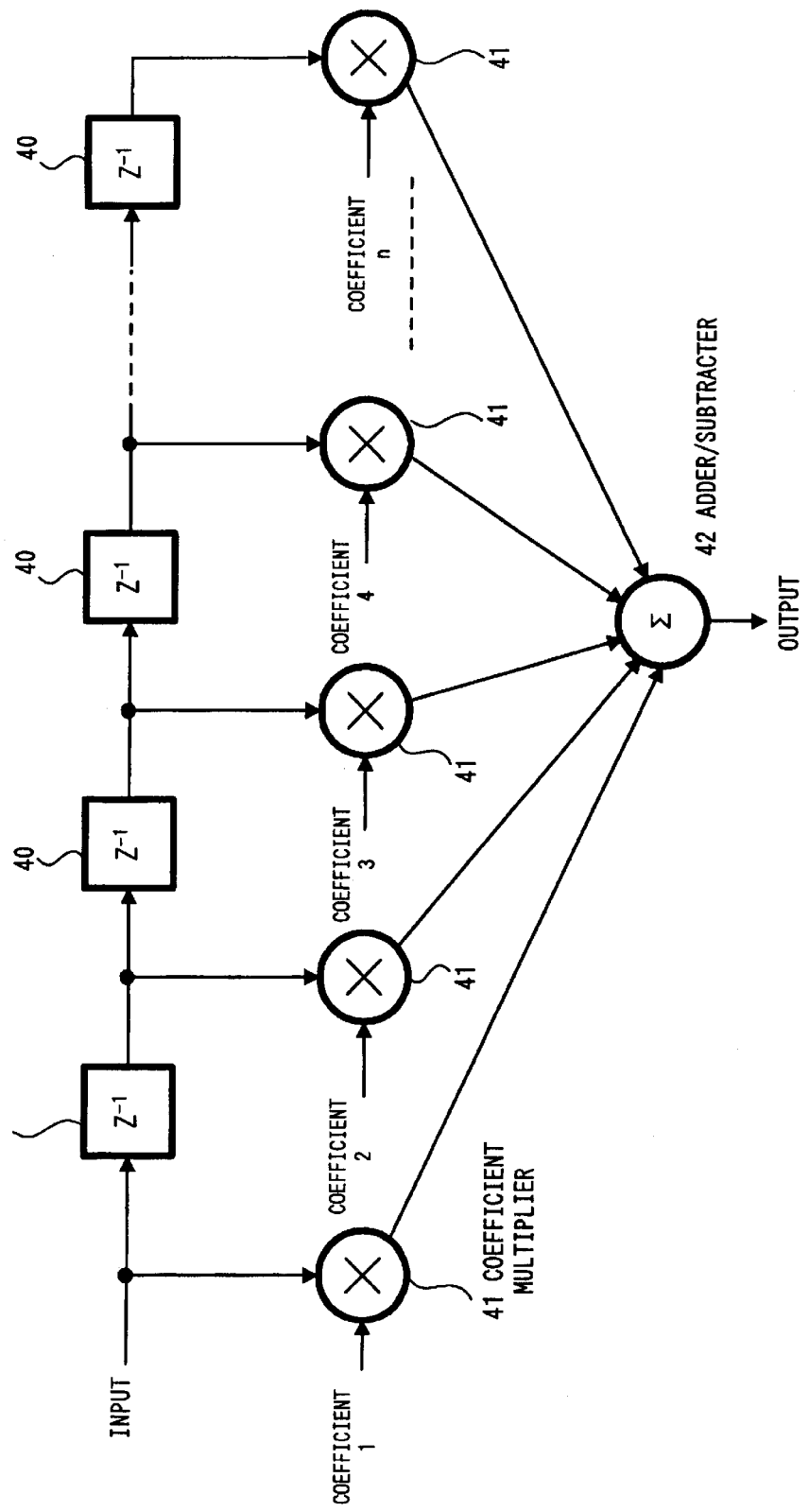
FIG. 13 is a configuration diagram showing an example of a fir transversal filter.

In the example of FIG. 1, serial digital video data of 80 Mbps is supplied to an input terminal 10 as an input signal. The input terminal 10 is connected to an amplitude modulator 11. This amplitude modulator 11 is formed of a LPF 11a, which includes a delay device 40, a coefficient multiplier 41 and an adder/subtracter 42 formed as a FIR transversal filter configuration as shown in FIG. 13, and a multiplier 11b which is supplied with a carrier of, for example, 80 MHz. An output end of the modulator 11 is connected to a preemphasis circuit 13 having a FIR transversal filter configuration similar to that described with reference to FIG. 13. An output end of the preemphasis circuit 13 is connected to a DAC 14. In the DAC 14, conversion to an analog video signal is conducted. Thereafter, only the baseband is extracted in an analog BPF 15. The baseband signal is amplified by an amplifier 16. Thereafter, a transmission output is supplied to the receiving side (such as the camera control unit 9) via the coaxial cable 6.

Figure 2A:
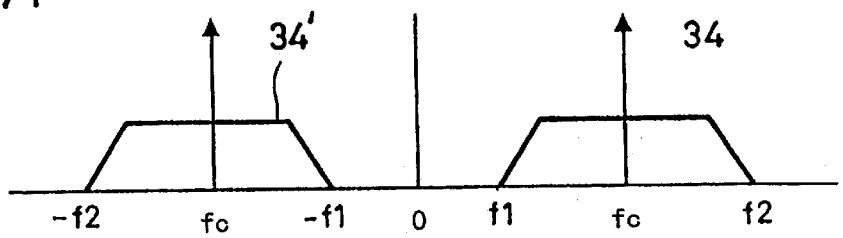
FIG. 2 and FIG. 3 are graphs used for the explanation of preemphasis characteristic according to the present invention.
Figure 9A:
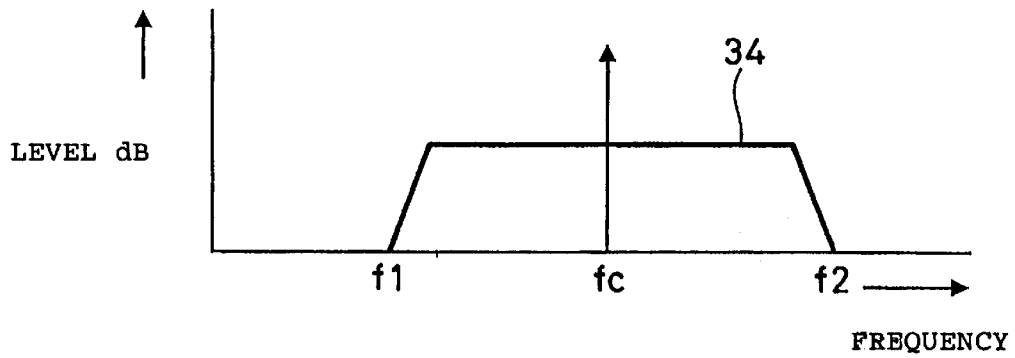
FIG. 9 and FIG. 10 are graphs used for the explanation of a conventional preemphasis characteristic.

Preemphasis conducted in the preemphasis circuit included in the video signal transmission apparatus having the above described configuration will now be described by referring to FIG. 2A through FIG. 2F. If the conventional modulated signal 34 as shown in FIG. 9A is seen as far as the negative region, it has frequency band characteristics 34 and 34' which are symmetric with respect to 0 (baseband) as shown in FIG. 2A.

Figure 2B:
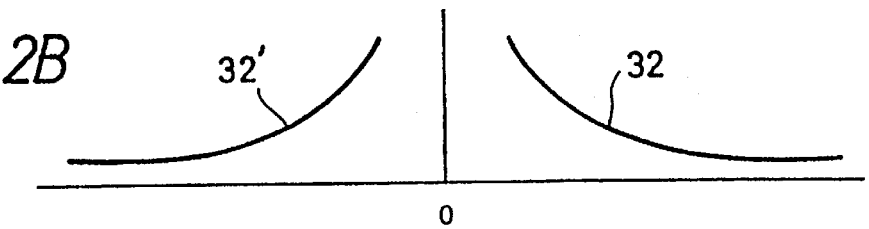
Figure 9B:
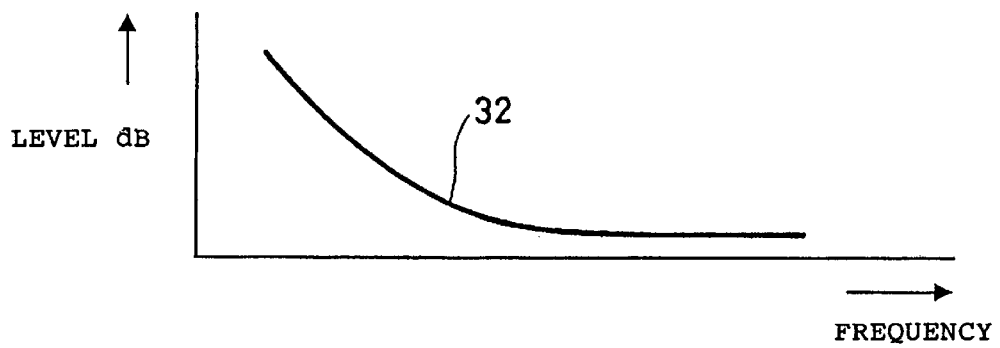
Figure 9C:
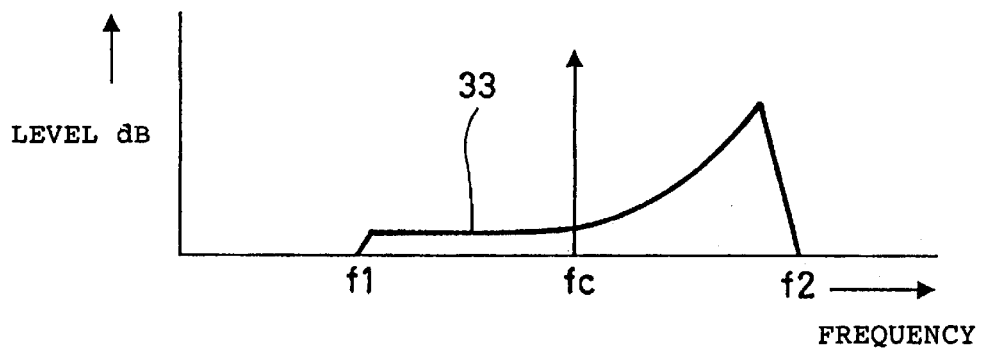
Figure 10A:
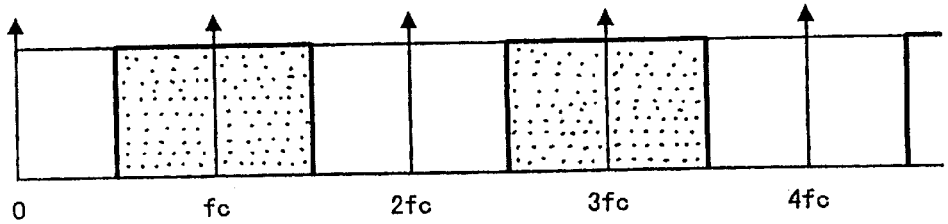
Figure 10B:
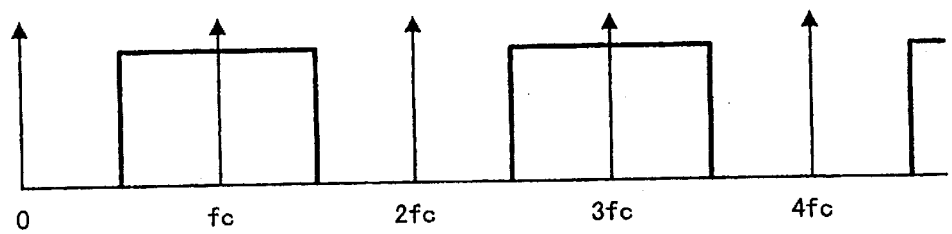
Figure 10C:
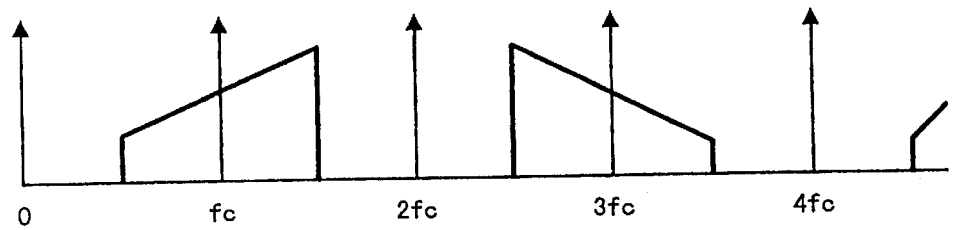
Figure 10D:
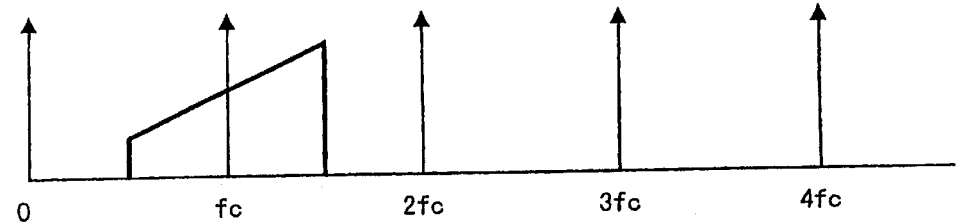
Figure 11A:
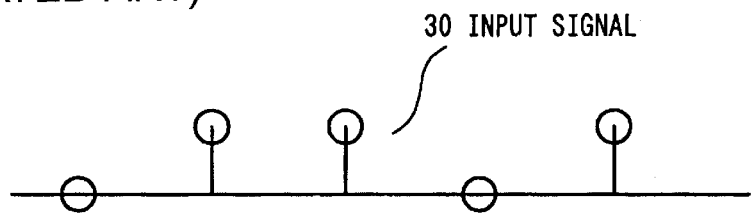
FIG. 11 is a graph used for the explanation of a conventional discrete time waveform.
Figure 11B:
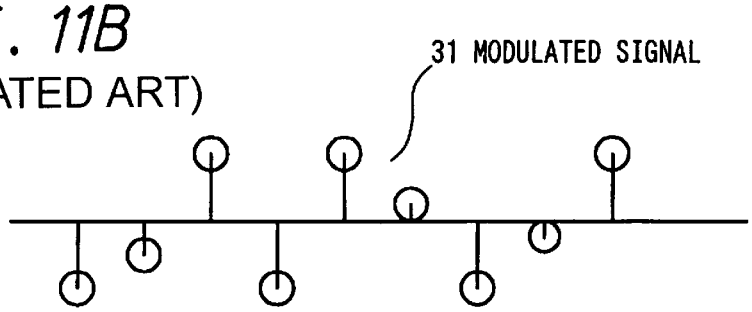
Figure 11C:
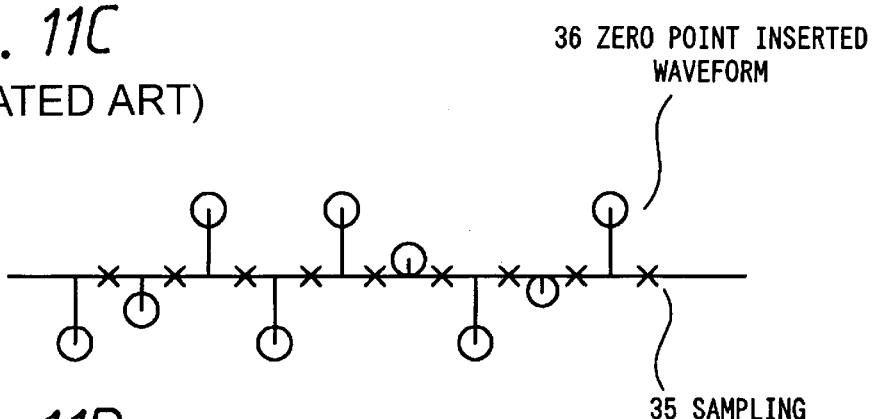
Figure 11D:
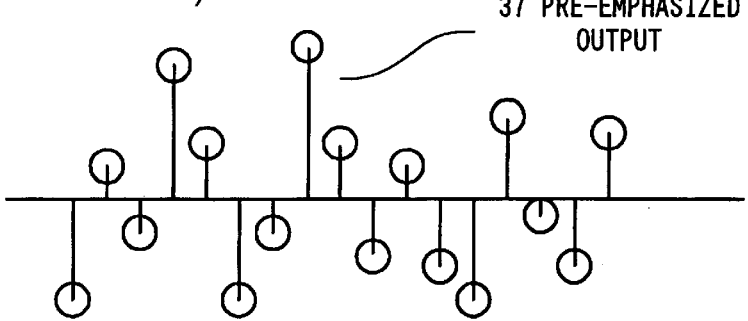
Figure 12B:
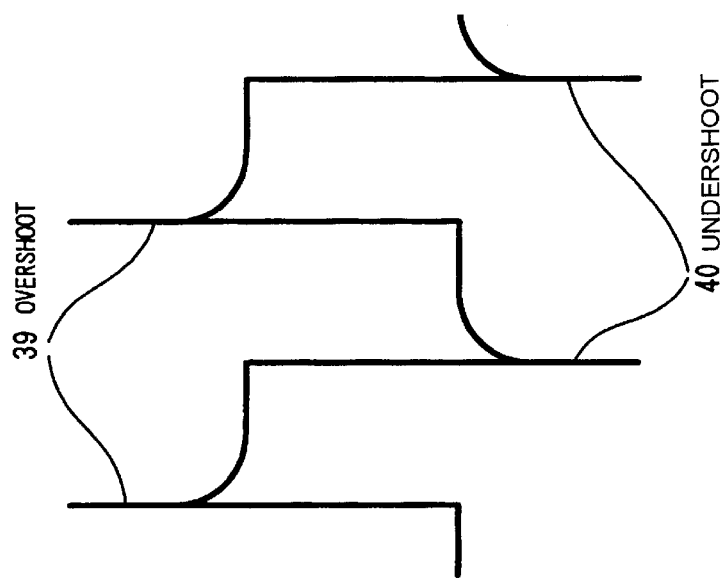
FIG. 12 is a graph used for the explanation of whisker-like components.
Figure 12A:
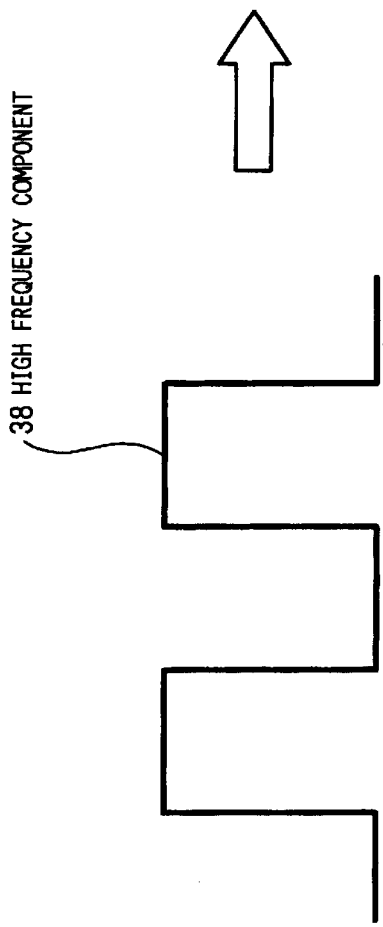

Furthermore, the transmission line characteristic 32 of the coaxial cable 6 shown in FIG. 9B also has transmission line characteristics 32 and 32' which are symmetric with respect to 0. Therefore, if a modulated video signal having the frequency band characteristics 34 and 34' of FIG. 2A with the 0 as a center is transmitted to the receiving side via the coaxial cable 6 having the transmission line characteristics 32 and 32' as shown in FIG. 2B as they are without effecting the preemphasis, then frequency band characteristics 33 and 33' of the modulated video signal on the receiving side become as shown in FIG. 2C.

Figure 2C:
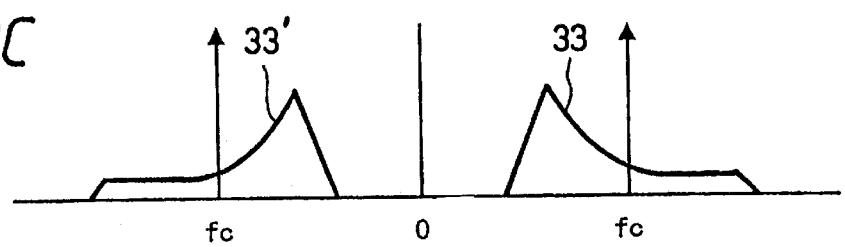
Figure 2D:
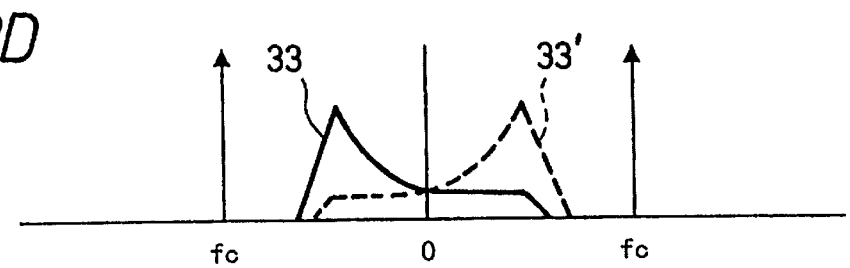
Figure 2E:
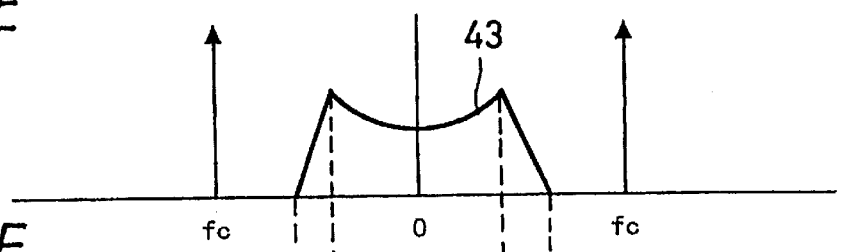

If the frequency band characteristics 33 and 33' of the amplitude modulated video signal as shown in FIG. 2C are subjected to synchronous detection on the receiving side with a carrier having the same carrier frequency fc of the carrier used at the time upon transmission, then the frequency band characteristics 33 and 33' are multiplied by each other as shown in FIG. 2D. Therefore, a frequency band characteristic 43 after detection becomes concave as shown in FIG. 2E. By observing this characteristic 43, it is understood that the frequency band characteristic does not get out of shape so much considering that it has passed through the coaxial cable 6 having the characteristic 32 as shown in FIG. 9B.

Figure 2F:
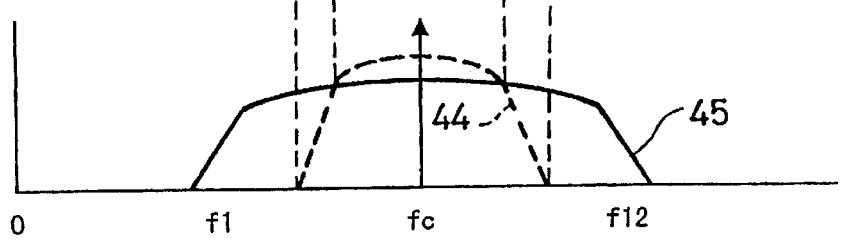
Figure 6:
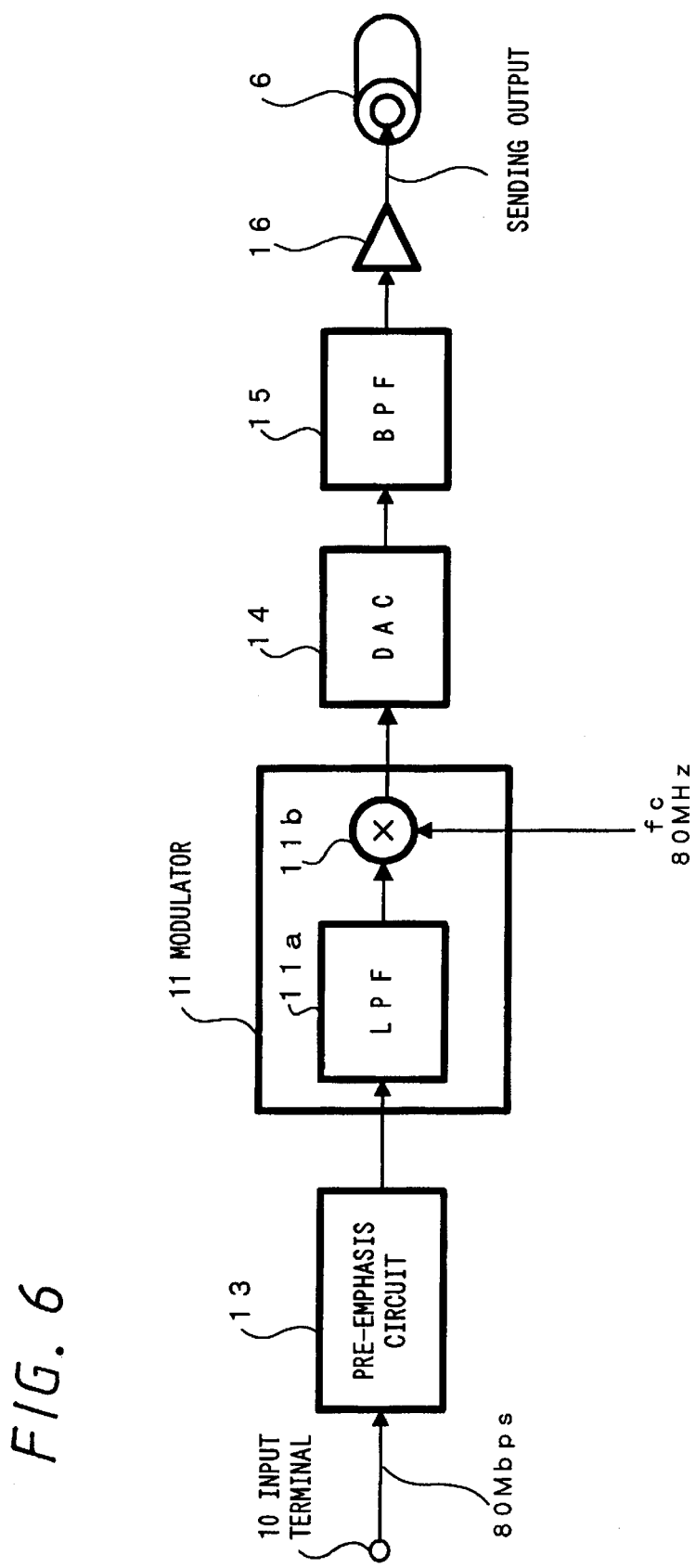
FIG. 6 is a system diagram showing a transmission apparatus according to the present invention.

In the present example, the preemphasis circuit 13 shown in FIG. 1 effects preemphasis with a frequency band characteristic 44 as represented by a broken line of FIG. 2F, which frequency band characteristic is an inverse characteristic to the frequency band characteristic 43 shown in FIG. 2E, and has a convex shape. In the above described case, the baseband of the input signal, i.e., of the serial digital video data is pre-emphasized first and then supplied to the modulator 11 as shown in FIG. 6. In the case where the preemphasis is applied after the modulation as shown in FIG. 1, however, the preemphasis of a convex characteristic which has spread somewhat as represented by a frequency band characteristic 45 in FIG. 2F is applied.

In other words, in the video signal transmission apparatus of the present example, by using an inverse characteristic to the frequency characteristic obtained after the detection as the characteristic of the preemphasis applied on the sending side as shown in FIG. 2F, it is possible to reduce the correction amount, the disorder of the transmission waveform, and the increase of the dynamic range as compared with the conventional preemphasis circuit.

Furthermore, this characteristic is symmetric with respect to the center carrier frequency fc. In the case where the preemphasis circuit 13 is formed by using a digital filter, therefore, the processing speed can be reduced to half as that of the conventional preemphasis circuit 13 having the characteristic which is asymmetric with respect to the center carrier frequency fc.

The reason will now be described by referring to FIG. 3 and FIG. 4 on the basis of FIG. 1. A serial digital signal of 80 Mbps as shown in FIG. 4A is input to the input terminal 10 as an input signal 30. This input signal 30 is supplied to an amplitude modulator 11. In a configuration of, for example, the DDS system, this amplitude modulator 11 conducts amplitude modulation on a carrier having a carrier frequency of 80 MHz by using the serial digital signal supplied as the input signal 30. As a result, there is obtained a modulated signal having a modulation characteristic 34 with the a carrier frequency fc as the center and with a bandwidth extending from f1 to f2 as shown in FIG. 9A. The modulated signal is transmitted via the coaxial cable 6.

Figure 3A:
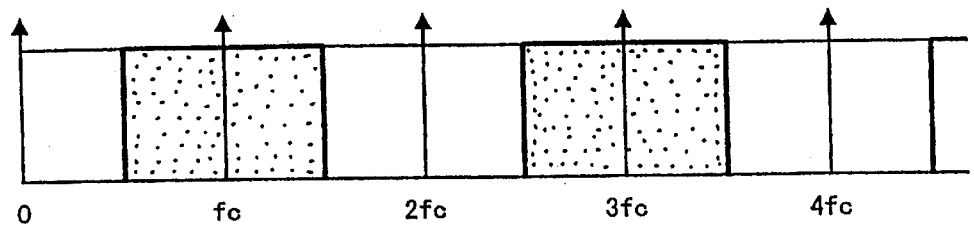
Figures 4A, 4B, 4C:
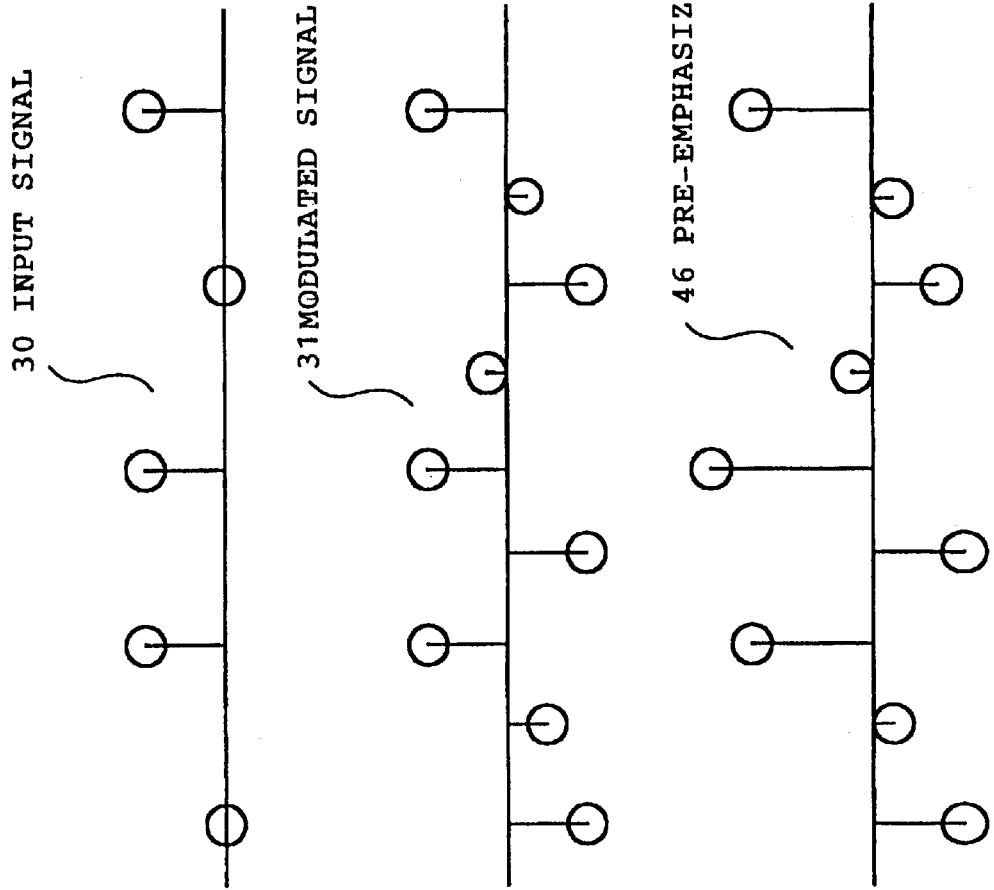
FIG. 4 is a graph used for the explanation of a discrete time waveform according to the present invention.

The LPF 11a of the modulator 11 extracts the baseband fc and a third harmonic 3fc located in the regions shown by dots in FIG. 3A.

Figure 3B:
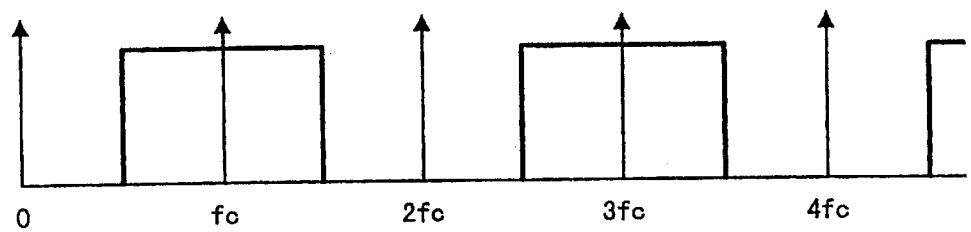

Subsequently in the multiplier 11b of the modulator 11, the carrier of 80 MHz is multiplied by the digital signal of 80 Mbps and is amplitude-modulated. As shown in FIG. 3B, the spectrum of a second harmonic 2fc is moved in frequency to the baseband fc. From the modulator 11, a modulated signal 31 of 80 Mbps×2=160 Mbps as shown in FIG. 4B is thus output.

Figure 3C:
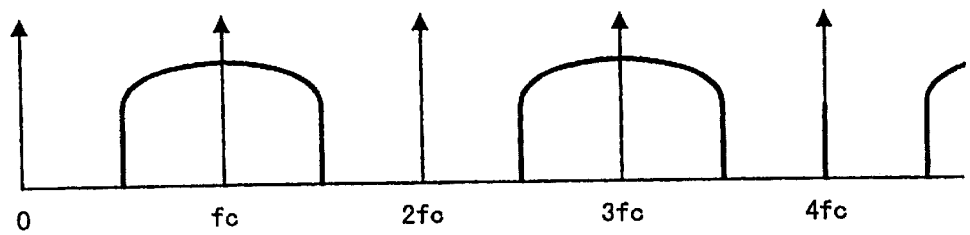

Subsequently, in the present example, the modulated signal of 160 Mbps is supplied to the preemphasis circuit 13 and emphasized therein. This preemphasis circuit 13 has a FIR transversal filter configuration in the same way as the foregoing description given with reference to FIG. 13. In this preemphasis circuit 13, emphasis is effected on the basis of a spectrum signal as shown in FIG. 3C. This emphasis curve is convex with the center carrier frequency fc as the center in the same way as the foregoing description given with reference to FIGS. 2C to 2F. The emphasis curve has a polarity opposite to that of the frequency band characteristic curve obtained when the modulated video signal (analog) sent to the coaxial cable 6 without being pre-emphasized is subjected on the receiving side to synchronous detection with the same carrier as that used at the time of modulation.

In the case where the spectrum signal as shown in FIG. 3C is derived in the preemphasis circuit 13, it is not necessary to insert the zero point insertion circuit 12 unlike the conventional technique because the spectrum is symmetric with respect to the center carrier frequency fc of the baseband. Since processing can be conducted with a digital signal processing frequency of 2fc, the modulated signal need only be 160 Mbps. Since the operation frequency need only be half of that of the conventional technique, the circuit scale can be reduced and consequently the power can be saved.

A pre-emphasized output 46 of 160 Mbps obtained as a result of the preemphasis conducted in the preemphasis circuit 13 becomes as represented by a discrete time waveform of FIG. 4C.

Figure 3D:
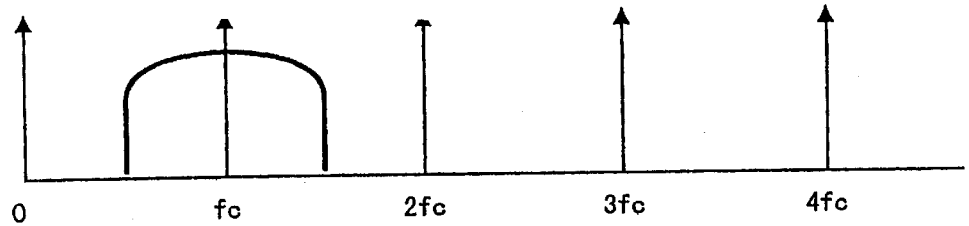

The pre-emphasized output signal is subjected to the digital-analog conversion in the digital-analog converter (DAC) 14, then passed through the analog bandpass filter (BPF) 15, amplified by the amplifier 16, and then supplied to the transmission line such as the coaxial cable 6 and the like as the transmission output. As a result, the pre-emphasized output signal is extracted as shown in FIG. 3D. The modulated video signal thus pre-emphasized is canceled in its high frequencies at the receiving end. A video signal having a flat frequency characteristic over the range of f1 to f2 is thus obtained.

Although the configuration shown in FIG. 6 was described above, according to this configuration, the baseband of the serial digital data (video signal) is first emphasized by the preemphasis circuit 13, and then amplitude-modulated by the amplitude modulator 11. The output of the amplitude modulator 11 is supplied to the DAC 14 and converted therein to an analog signal. Only the baseband component thereof is extracted in the BPF and amplified in the amplifier 16. Then the transmission output is sent out on the coaxial cable 6.

Figure 5:
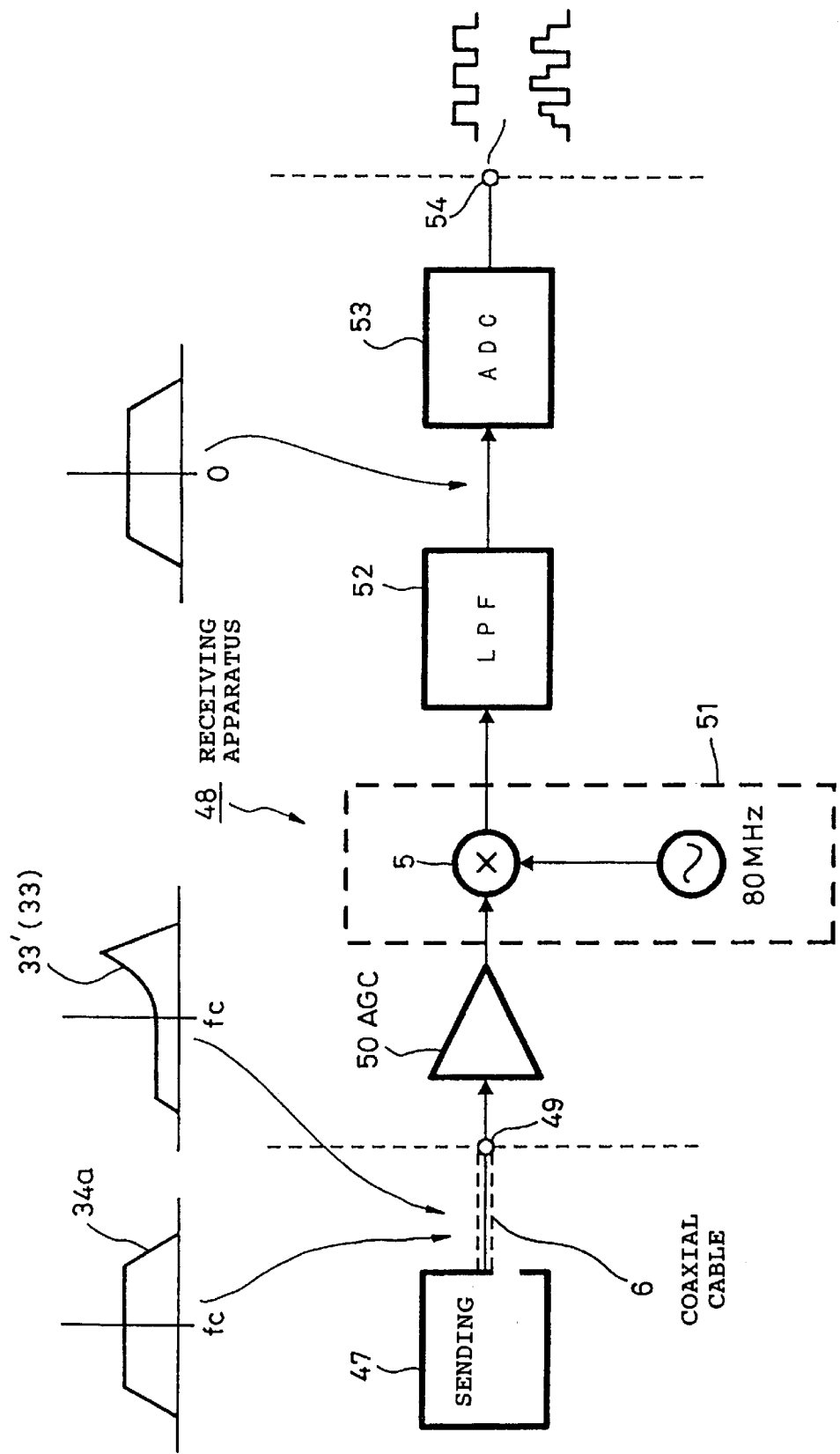
FIG. 5 is a system diagram on a receiving side of an example of a video signal transmission apparatus according to the present invention.

Furthermore, FIG. 5 shows the system diagram of an example of a receiving apparatus for receiving and detecting a video signal transmitted from a transmission apparatus 47 which transmits the pre-emphasized video signal via the coaxial cable 6 as shown in FIG. 1.

With reference to FIG. 5, an analog video signal of the transmitting output from the amplifier 16 of the transmission apparatus 47 is supplied to an AGC (automatic gain control circuit) 50 via the coaxial cable 6 through an input terminal 49 of the receiving apparatus (for example, such as the camera control unit 9). In a detection circuit 51, a carrier signal of 80 MHz is supplied from a carrier oscillator 51a and detection is conducted. The transmission output sent out from the transmission apparatus 47 without being pre-emphasized as described before and having the frequency band characteristic 33 or 33' shown in FIG. 2C is subjected to synchronous detection. A characteristic curve having an inverse frequency band characteristic with respect to the frequency band characteristic of the detected output is derived. The characteristic curve is obtained as the output of the detection circuit 51.

The detected output of the detection circuit 51 is supplied to a ADC (or a comparator) 52 via a LPF 52 and then digitized. A binary or multi-valued pulse waveform or the like is output from an output terminal 54. If preemphasis is applied by the preemphasis circuit 13 of the present example, a transmission output signal having a flat frequency band characteristic 34*a* as shown in FIG. 5 according to the attenuation characteristic of the coaxial cable 6 is supplied to the input terminal 49 of the receiving apparatus 48.

According to the video signal transmission apparatus and the video signal transmission method of the present invention, the correction quantity is reduced. Therefore, the increase of the dynamic range of the transmission output on the transmission apparatus can be held at a minimum and also the disorder of the transmission waveform can be reduced. In addition, since the preemphasis characteristic is symmetric with respect to the center carrier frequency fc, the processing frequency required when forming the preemphasis circuit need only be half, and the circuit scale can be reduced, and consequently the power can be saved.

What is claimed is:

1. A video signal transmission apparatus comprising:
   an amplitude modulation means for amplitude-modulating a carrier by using digital video data;
   a preemphasis means for applying a preemphasis to a modulated signal modulated by said modulation means or a baseband of a digital video data;
   a digital-to-analog conversion means for converting output data pre-emphasized by said preemphasis means or said modulated signal to an analog video signal; and
   a wire transmission line for transmitting an analog video signal supplied from said digital-to-analog conversion means to a receiving end,
   whereby said preemphasis is obtained by generating an inverse of a frequency characteristic, and
   whereby said frequency characteristic is created by simulating transmission of a non-preemphasized analog video signal over said wire transmission line to said receiving end.

2. In a video signal transmission method for amplitude-modulating a carrier by using digitized video data, applying preemphasis to the modulated signal, and then transmitting a resultant signal to a receiving end via a wire transmission line as an analog video signal,
   the video signal transmission method being characterized in that said preemphasis is obtained by generating an inverse of a frequency characteristic,
   whereby said frequency characteristic is created by simulating transmission of a non-preemphasized resultant signal over said wire transmission line to said receiving end.

3. In a video signal transmission method for preemphasizing a baseband of digitized video data, amplitude-modulating a carrier by using a resultant signal, and then transmitting a resultant analog video signal to a receiving end via a wire transmission line,
   the video signal transmission method being characterized in that said preemphasis is obtained by generating an inverse of a frequency characteristic,
   whereby said frequency characteristic is created by simulating transmission of a non-preemphasized resultant analog video signal over said wire transmission line to said receiving end.

* * * * *